(12) United States Patent
Yang et al.

(10) Patent No.: US 12,229,518 B2
(45) Date of Patent: Feb. 18, 2025

(54) DIALOGUE SYSTEM FOR AUTONOMOUS AIRCRAFT

(71) Applicant: The Boeing Company, Chicago, IL (US)

(72) Inventors: Li Yang, Huntsville, AL (US); Michael C. Kline, Colorado Springs, CO (US)

(73) Assignee: The Boeing Company, Arlington, VA (US)

( * ) Notice: Subject to any disclaimer, the term of this patent is extended or adjusted under 35 U.S.C. 154(b) by 315 days.

(21) Appl. No.: 17/453,598

(22) Filed: Nov. 4, 2021

(65) Prior Publication Data
US 2022/0194576 A1    Jun. 23, 2022

Related U.S. Application Data

(60) Provisional application No. 63/126,967, filed on Dec. 17, 2020.

(51) Int. Cl.
*G06F 40/35*    (2020.01)
*G05B 13/02*    (2006.01)
(Continued)

(52) U.S. Cl.
CPC ........... *G06F 40/35* (2020.01); *G05B 13/027* (2013.01); *G06F 40/279* (2020.01); *G06F 40/40* (2020.01);
(Continued)

(58) Field of Classification Search
CPC ..... B64C 39/024; G06F 40/35; G06F 40/279; G06F 40/40; G05B 13/027; G08G 5/0013;
(Continued)

(56) References Cited

U.S. PATENT DOCUMENTS 6,136,161 A    10/2000   Yu et al.
6,407,847 B1    6/2002   Poll et al.
(Continued)

FOREIGN PATENT DOCUMENTS

EP    3364396 A2    8/2018
EP    3364396 A3    1/2019
WO    WO-2005123443 A2 *  12/2005  ............. G01C 21/20

OTHER PUBLICATIONS

Machine of translation of WO 2005123443 A2 (Year: 2005).*
(Continued)

*Primary Examiner* — Hussein Elchanti
*Assistant Examiner* — Kenneth M Dunne
(74) *Attorney, Agent, or Firm* — Alleman Hall & Tuttle LLP (57) ABSTRACT

A method of controlling autonomous vehicles is described. The method comprises receiving a text string regarding operation of an autonomous aircraft, analyzing the text string via a decoder module to identify one or more linguistic aircraft control components in the text string, and accessing an aircraft-related knowledge base associated with the decoder module to validate one or more identified linguistic aircraft control components. The method further comprises, based at least on the identified linguistic aircraft control components, determining a command for controlling the autonomous aircraft, and outputting the command for execution by the autonomous aircraft.

20 Claims, 5 Drawing Sheets

(51) Int. Cl.
  *G06F 40/279* (2020.01)
  *G06F 40/40* (2020.01)
  *G08G 5/00* (2006.01)
  *G10L 15/16* (2006.01)
  *G10L 15/22* (2006.01)

(52) U.S. Cl.
  CPC ......... *G08G 5/0013* (2013.01); *G08G 5/0069* (2013.01); *G10L 15/16* (2013.01); *G10L 15/22* (2013.01); *B64U 2201/00* (2023.01); *B64U 2201/10* (2023.01); *G10L 2015/223* (2013.01)

(58) Field of Classification Search
  CPC ....... G08G 5/0069; G10L 15/16; G10L 15/22; G10L 2015/223; B64U 2201/10
  See application file for complete search history.

(56) References Cited

U.S. PATENT DOCUMENTS

| | | | |
|---|---|---|---|
| 6,594,067 | B2 | 7/2003 | Poll et al. |
| 6,671,080 | B2 | 12/2003 | Poll et al. |
| 10,403,274 | B2 * | 9/2019 | Girod .................... B64D 43/00 |
| 10,705,402 | B2 | 7/2020 | Whittingham et al. |
| 2003/0110028 | A1 | 6/2003 | Bush |
| 2008/0065275 | A1 | 3/2008 | Vizzini |
| 2008/0201148 | A1 * | 8/2008 | Desrochers ........... G10L 15/183 704/E15.044 |
| 2012/0033287 | A1 | 2/2012 | Friedman et al. |
| 2015/0362817 | A1 | 12/2015 | Patterson et al. |
| 2016/0026055 | A1 | 1/2016 | Choi et al. |
| 2016/0093302 | A1 * | 3/2016 | Bilek ...................... G10L 25/48 704/235 |
| 2016/0161946 | A1 | 6/2016 | Wuth Sepulveda et al. |
| 2017/0162203 | A1 * | 6/2017 | Huang .................. G10L 15/197 |
| 2018/0061243 | A1 * | 3/2018 | Shloosh ............... G08G 5/0043 |
| 2020/0183983 | A1 * | 6/2020 | Abe .................. G06F 16/90332 |
| 2022/0115008 | A1 * | 4/2022 | Pust ...................... G08G 5/0013 |

OTHER PUBLICATIONS

Ohneiser et al, "Air traffic controller support by speech recognition", 2014, Saarland University (Year: 2014).*

Kleinert et al, "Reducing Controller workload by automatic speech recognition aississted radar label maintenance", 2019, Institute of Flight Guidance German aerospace center (Year: 2019).*

Helmke et al, "Assistant-Based Speech Recognition for ATM Applications", 2015, Eleventh USA/Europe Air Traffic Management Research and Development Seminar (Year: 2015).*

Kleinert et al, "Building Blocks of Assistant Based Speech Recognition for Air Traffic Management Applications", SESAR (Year: 2018).*

European Patent Office, Extended European Search Report Issued in Application No. 21204432.5, Apr. 20, 2022, Germany, 9 pages.

Oualil, Y. et al., "A Context-Aware Speech Recognition and Understanding System for Air Traffic Control Domain" Proceedings of IEEE Automatic Speech Recognition and Understanding Workshop, Dec. 16, 2017, Okinawa, Japan, 5 pages.

Mrkšić et al., "Neural Beleif Tracker: Data-Driven Dialogue State Tracking," Proceedings of the 55th Annual Meeting of the Association for Computational Linguistics, Jul. 2017, Vancouver Canada, 24 pages.

Madotto et al., "Mem2Seq: Effectively Incorporating Knowledge Bases into End-to-End Task-Oriented Dialog Systems," The Association for Computational Linguistics, 2018, 40 pages.

Lei et al., "Sequicity: Simplifying Task-oriented Dialogue Systems with Single Sequence-to-Sequence Architectures," Proceedings of the 56th Annual Meeting of the Association for Computational Linguistics, 2018, 22 pages.

Jurafksy et al., "Chapter 26. Dialogue Systems and Chat-bots," Speech and Language Processing, 2019, 35 pages.

Qin et al., "Joint Modeling of Content and Discourse Relations in Dialogues," Proceedings of the 55th Annual Meeting of the Association for Computational Linguistics, 2017, 22 pages.

Sanuj et al., "Improving Dialogue State Tracking by Discerning the Relevant Context," Proceedings of the 2019 Conference of the North American Chapter of the Association for Computational Linguistics: Human Language Technologies, 2019, 12 pages.

Zhong et al., "Global-Locally Self-Attentive Dialogue State Tracker," In Proceedings of the 56th Annual Meeting of the Association for Computational Linguistics, 2018, 20 pages.

Dhingra et al., "Towards End-to-End Reinforcement Learning of Dialogue Agents for Information Access," Proceedings of the 55th Annual Meeting of the Association for Computational Linguistics, 2017, 24 pages.

Xu et al., "An End-to-end Approach for Handling Unknown Slot Values in Dialogue State Tracking" Proceedings of the 56th Annual Meeting of the Association for Computational Linguistics, 2018, 20 pages.

Gangadharaiah et al., "Joint Multiple Intent Detection and Slot Labeling for Goal-Oriented Dialog," Proceedings of the 2019 Conference of the North American Chapter of the Association for Computational Linguistics: Human Language Technologies, 2019, 12 pages.

* cited by examiner

DIALOGUE SYSTEM FOR AUTONOMOUS AIRCRAFT

CROSS REFERENCE TO RELATED APPLICATIONS

This application claims priority to U.S. Provisional Patent Application Ser. No. 63/126,967, filed Dec. 17, 2020, the entirety of which is hereby incorporated herein by reference for all purposes.

FIELD

The embodiments herein relate to autonomous aircraft, and more particularly to controlling autonomous aircraft based on speech.

BACKGROUND

The operation of aircraft typically involves communication between pilots and air traffic control (ATC). ATC directs traffic on the ground and in the air, enforcing separation among aircraft, sequencing activity, managing congestion and use of resources, assigning priorities, and accounting for weather activity. To this end, air traffic controllers, typically housed in a tower, communicate clearances directing aircraft movement throughout all phases of flight, from taxiing to landing. This approach requires highly developed knowledge and skill from human pilots to successfully interpret clearances and other information from ATC. Such requirements in part result from the highly specific and technical terminology in ATC communications, necessitating not only deep knowledge to understand individual terms but also the greater meaning of complex instructions made up of multiple terms. In addition, deep operational knowledge of aircraft is needed to determine the appropriate aircraft actions to perform based on ATC clearances, as is a contextual awareness of the overall situation, particularly where deviation from ATC clearances is appropriate.

Unlike manned aircraft, unmanned aircraft are not afforded the knowledge and skill of on-board pilots to facilitate operation. In some contexts, this may not pose issues, such as where an unmanned aircraft is remotely controlled by a human pilot or is equipped to travel entirely autonomously. A lack of on-board pilots can cause issues in other contexts, however. For example, integrating an autonomous aircraft in contexts where communication with ATC is required, such as in a controlled airspace, remains an unsolved problem due in part to challenges in understanding ATC communications at the autonomous aircraft. A lack of on-board pilots means that the human knowledge and skill required to understand the terminology and overall meaning of ATC communications, and to execute appropriate actions in response, is not present at the autonomous aircraft. The inability to autonomously understand ATC communications exacerbates the already significant challenge of building and deploying autonomous aircraft.

In view of the above, challenges exist in integrating autonomous aircraft in controlled airspaces and other contexts in which communication with ATC occurs.

SUMMARY

To address the above issues, according to one aspect of the present disclosure, a method of controlling autonomous vehicles is provided. In this aspect, the method comprises receiving a text string regarding operation of an autonomous aircraft, analyzing the text string via a decoder module to identify one or more linguistic aircraft control components in the text string, and accessing an aircraft-related knowledge base associated with the decoder module to validate one or more identified linguistic aircraft control components. The method further comprises, based at least on the identified linguistic aircraft control components, determining a command for controlling the autonomous aircraft, and outputting the command for execution by the autonomous aircraft.

Another aspect of the present disclosure relates to a system for controlling autonomous aircraft. In this aspect, the system comprises a logic subsystem and a storage subsystem comprising instructions executable by the logic subsystem to (1) receive a text string regarding operation of an autonomous aircraft, (2) analyze the text string via a decoder module to identify one or more linguistic aircraft control components in the text string, and (3) access an aircraft-related knowledge base associated with the decoder module to validate one or more identified linguistic aircraft control components. The storage subsystem further comprises instructions executable by the logic subsystem to, based at least on the identified linguistic aircraft control components, determine a command for controlling the autonomous aircraft, and output the command for execution by the autonomous aircraft.

Yet another aspect of the present disclosure relates to an autonomous aircraft, comprising a propulsion system, a logic subsystem, and a storage subsystem comprising instructions executable by the logic subsystem to receive a text string regarding operation of the autonomous aircraft, analyze the text string via a decoder module to identify one or more linguistic aircraft control components in the text string, and access an aircraft-related knowledge base associated with the decoder module to validate one or more identified linguistic aircraft control components. The storage subsystem further comprises instructions executable by the logic subsystem to, based at least on the identified linguistic aircraft control components, determine a command for controlling the autonomous aircraft, and transmit an indication of the command to air traffic control.

The features, functions, and advantages that have been discussed can be achieved independently in various embodiments or may be combined in yet other embodiments, further details of which can be seen with reference to the following description and drawings.

DETAILED DESCRIPTION

In view of the considerations above, methods, systems, and apparatuses are provided that relate to controlling autonomous aircraft based on speech. Briefly, a text string regarding operation of an autonomous aircraft is analyzed via a decoder module to identify one or more linguistic aircraft control components in the text string. As examples, the text string can be derived from communications from an air traffic control (ATC) tower, and the linguistic aircraft control component(s) can include clearances, call signs, destinations, routes, and/or other components. An aircraft-related knowledge base associated with the decoder module is accessed to validate one or more identified linguistic aircraft control components, which can include validating an existence of a component in the knowledge base, determining that a flight path is valid, and/or other operations. Based at least on the identified linguistic aircraft control components, a command for controlling the autonomous aircraft is determined and output for execution by the autonomous aircraft.

The approaches described herein enable an autonomous aircraft, for example, to interpret and respond to communications from ATC and execute appropriate actions. Additionally, the interpretation and action determination can form part of a dialogue system with which an autonomous aircraft responds to ATC via natural language read back messages that can be interpreted by air traffic controllers. With these capabilities, autonomous aircraft can be integrated into controlled airspaces and other scenarios in which communication between aircraft and ATC occurs, greatly expanding the contexts in which autonomous aircraft can be effectively and safely used, and supporting the implementation of fully autonomous aircraft that do not require human oversight during operation. As described in further detail below, actual ATC communications can be crowdsourced and used to train the decoder module to identify linguistic aircraft control components in text strings and thereby enable the autonomous aircraft to interpret ATC communications. This approach provides an efficient mechanism for collecting training data and decoding text strings with high accuracy.

Figure 1:
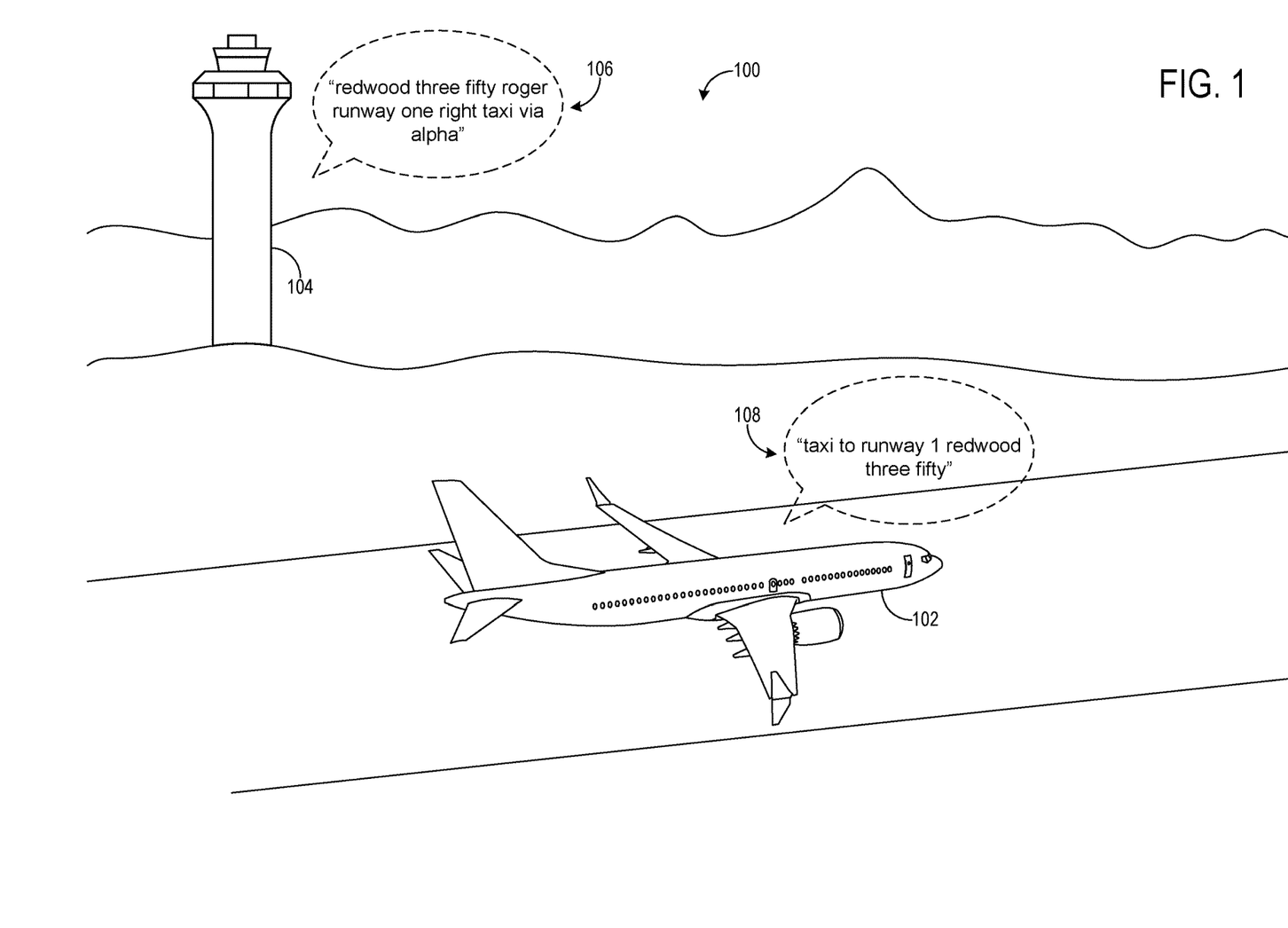
FIG. 1 shows an illustration depicting an airdrome in which an autonomous aircraft receives ATC communications from an ATC tower according to an example embodiment of the present disclosure.

FIG. 1 depicts an example airdrome 100 in which an autonomous aircraft 102 receives ATC communications from an ATC tower 104. In this example, ATC tower 104 transmits a clearance (indicated at 106) instructing aircraft 102 to taxi to a particular runway (runway 1) via a particular route (alpha). Clearance 106 is communicated via speech spoken by an air traffic controller located at ATC tower 104 via a very high frequency radio link between ATC tower 104 and aircraft 102 or any other suitable communication mechanism. Further, clearance 106 is converted into a text string by performing speech recognition on audio capturing the speech. As described elsewhere, speech recognition can be performed on-board aircraft 102 or elsewhere such as at ATC tower 104 or other ATC ground station.

Via a decoder module described below, the text string is decoded to identify linguistic aircraft control components in the text string that make up clearance 106. In this example, such components include a callsign (redwood three fifty) assigned to aircraft 102, an operation (taxi), a destination (runway 1), and a route (alpha). Using other modules also described below, one or more of the linguistic aircraft control components are validated, which can include verifying an existence of a control component in an aircraft-related knowledge base, using a mapping service to validate the route, and/or other operations. Based on the identified linguistic aircraft control components, and potentially on other information—such as prior events, prior clearances received from ATC, ground activity, and weather activity—a command for controlling aircraft 102 is determined. In this example, execution of the command causes aircraft 102 to taxi to the destination (runway 1) via the route (alpha) identified in clearance 106. Aircraft 102 can also respond to clearance 106 via a natural language message (indicated at 108) acknowledging the clearance 106. Being phrased as a natural language response, message 108 can be directly understood by an air traffic controller at ATC tower 104. In some examples, speech conveying message 108 can be synthesized and relayed to ATC such that the message 108 is received as if ATC were communicating with a piloted aircraft.

While being depicted as an airliner, aircraft 102 can assume any form of an autonomous aircraft. Examples include but are not limited to light aircraft, large aircraft, powered aircraft, unpowered aircraft, airplanes, airships, helicopters, and spacecraft. Further, "autonomous aircraft" as used herein can refer to unpiloted aircraft occupied by non-pilot humans (e.g., passengers) and/or unpiloted, unoccupied aircraft. While FIG. 1 illustrates aircraft-ATC dialogue during taxiing, the approaches described herein for providing an autonomous aircraft that autonomously interprets aircraft control communications and executes corresponding actions apply to phases of flight other than taxiing, including takeoff, climb, cruise, descent, approach, and/or landing.

Figure 2:
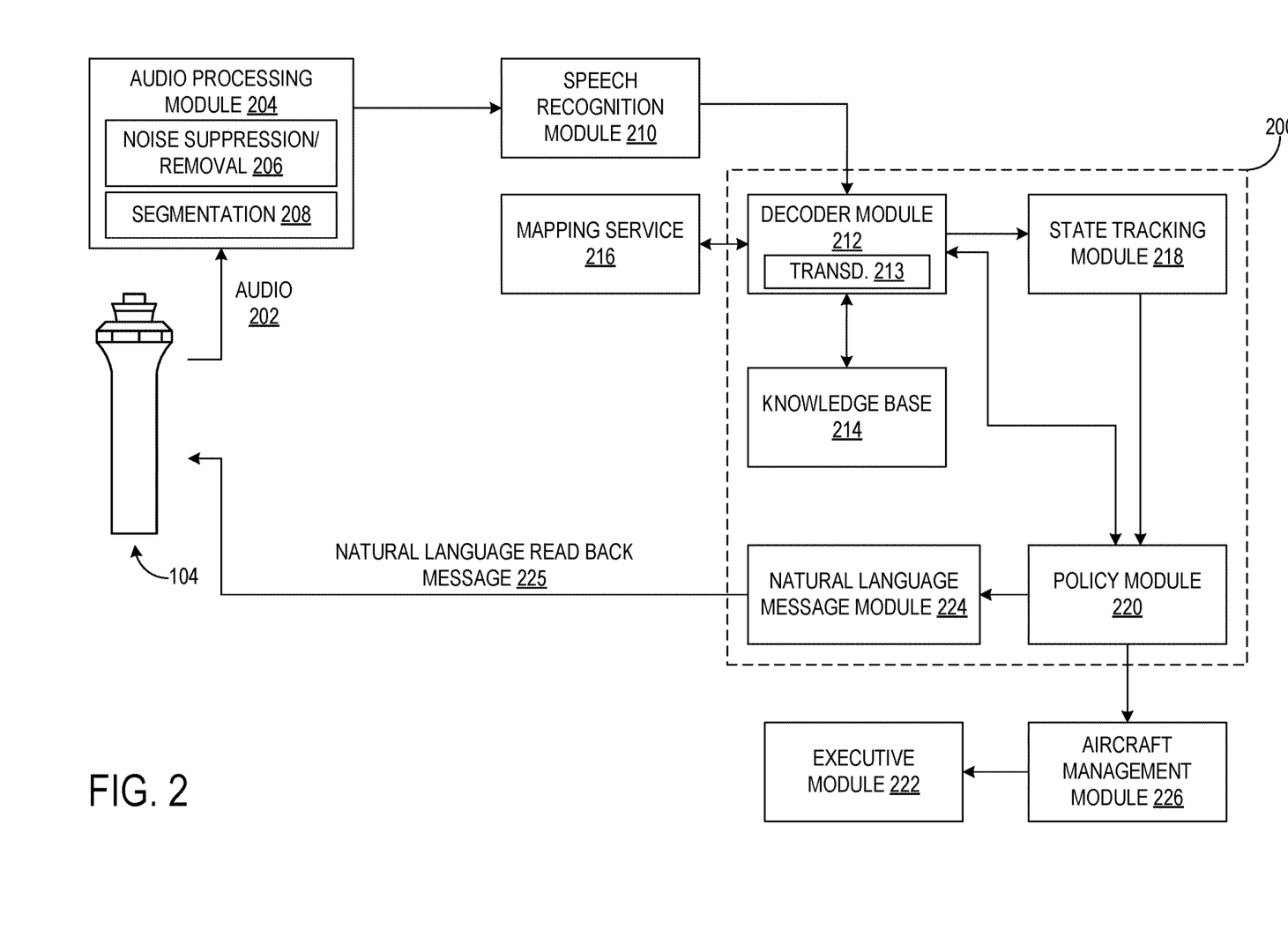
FIG. 2 shows an illustration depicting a dialogue system with which an autonomous aircraft and ATC can communicate via speech according to an example embodiment of the present disclosure.

FIG. 2 depicts an example dialogue system 200 with which an autonomous aircraft and ATC can communicate via speech. As described in further detail below, system 200 includes various modules that can be implemented at locations associated with ATC, such as an ATC tower, and/or at an autonomous aircraft. Aspects of system 200 can be implemented to facilitate dialogue between autonomous aircraft 102 and ATC tower 104, for example.

In the depicted example, audio 202 capturing speech directed to operation of an autonomous aircraft is received at an audio processing module 204. In the depicted example, audio 202 is received from ATC tower 104, but can be received from any suitable source including from a pilot on board the autonomous aircraft. Audio processing module 204 includes a noise suppression module 206 operable to suppress/remove noise in audio 202, where suppression/removal can include filtering the audio and/or any other suitable audio processing. Audio processing module 204 further includes a segmentation module 208 operable to segment portions of audio 202 capturing the speech directed to operation of the autonomous aircraft from other portions of the audio 202 that do not capture such speech, such as silence. In some examples, modules 206 and 208 can be combined to provide noise suppression/removal and segmentation in a common audio processing step. In other examples, audio processing via module 204 can be omitted or modified to include any suitable type of audio processing.

Audio 202 capturing speech directed to operation of the autonomous aircraft can include aircraft control communications, which as used herein refers to communications directed to an aircraft including while on the ground and during flight. In some examples, aircraft control communications include one or more ATC clearances. As used herein, an "ATC clearance" refers to an authorization by ATC for an aircraft to proceed. In some examples, an "ATC clearance" as used herein can refer to communications other than an ATC authorization, such as an advisory, weather information, and/or traffic information.

In the depicted example, audio processing module 204 outputs processed audio having undergone noise suppression/removal and segmentation. A speech recognition module 210 receives the processed audio and performs speech recognition on the audio, which produces a text string that includes the speech recognized in the processed audio. Module 210 can employ any suitable mechanisms for recognizing speech, including but not limited to hidden Markov models, dynamic time warping, and neural networks. As a particular example, module 210 can employ a deep-learning trained recurrent neural network-connectionist temporal classification model to recognize speech.

Dialogue system 200 includes a decoder module 212 that receives the text string output by speech recognition module 210. Decoder module 212 identifies one or more linguistic aircraft control components in the text string. Generally, a linguistic aircraft control component is a word, term, phrase, or other linguistic element in a text string relating to operation of an aircraft. As examples, linguistic aircraft control components can include but are not limited to an ATC clearance, an airport object (e.g., runway, fuel pit, taxiway), a callsign, an operation, and location information (e.g., origin, destination, route, information regarding a flight plan).

Figure 3:
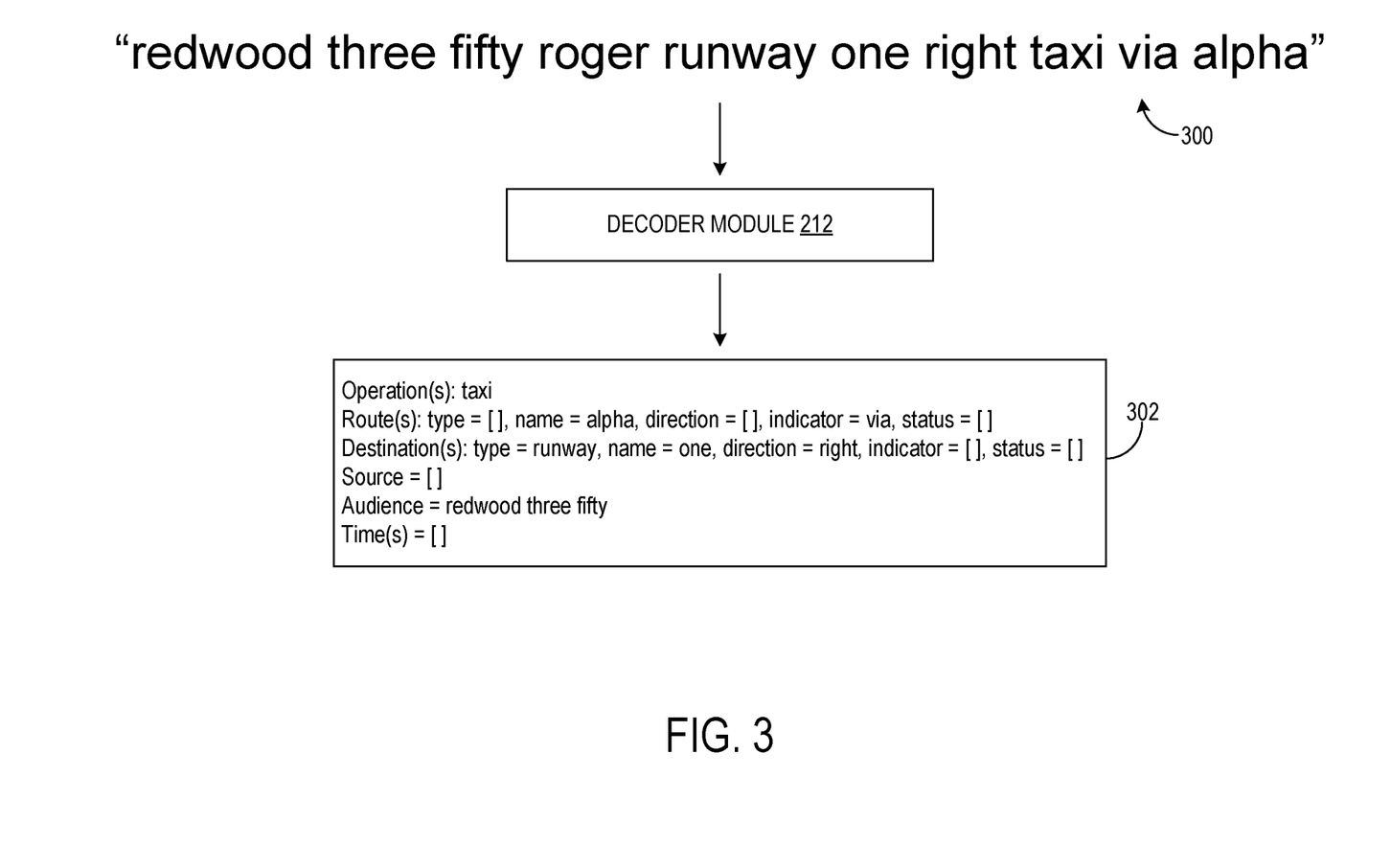
FIG. 3 shows an illustration depicting the identification of linguistic aircraft control components in a text string via a decoder module according to an example embodiment of the present disclosure.

FIG. 3 illustrates an example of identifying linguistic aircraft control components in a text string 300 via decoder module 212. Text string 300 is derived from ATC clearance 106 issued by ATC tower 104 in FIG. 1. In this example, the linguistic aircraft control components identified in text string 300 include an operation (taxi); route information including a name of a route (alpha) and a linguistic indicator (via) of the presence of route information; destination information including a type of the destination (runway), a name of the destination (one), and a direction in which to proceed to the destination (right); and an audience (redwood three fifty) identified by the callsign assigned to autonomous aircraft 102. The identified linguistic aircraft control components can be filled in a template 302, which can include predefined fields and attributes. FIG. 3 also illustrates other linguistic aircraft control components and their attributes that can be identified in text strings, including a type, direction, and status of a route, a linguistic indicator of the presence of a destination and a status of the destination, a source of the clearance (e.g., the ATC tower from which the clearance originated), and time(s) associated with the clearance. Generally, decoder 212 can be configured to identify any suitable linguistic aircraft control components and component attributes in text strings, where such configuring can be part of a training process described below.

Decoder module 212 can identify linguistic aircraft control components in any suitable manner. In some examples, decoder module 212 identifies boundaries between words or terms in a text string. Further, decoder module 212 can apply trie- and/or finite-state transducer-based sequence tagging algorithm(s) to a text string to identify linguistic aircraft control components. As such, FIG. 2 depicts in the inclusion of a transducer 213 (e.g., trie- and/or finite-state transducer) in decoder module 212. However, transducer 213 can be implemented at any suitable location. In some examples, decoder module 212 can employ natural language processing to tokenize a text string. In such examples, natural language processing can be performed in an aviation-related domain—e.g., to tag or identify linguistic aircraft control components and/or detect events in text strings. Trie- and/or finite state transducer-based sequence tagging can be employed, for example (e.g., via transducer 213). In some examples, decoder module 212 can parse a clearance based on a predefined ontology, which can be used to determine semantic attributes that describe the clearance. Decoder module 212 can apply any suitable combination of the aforementioned mechanisms to identify linguistic aircraft control components, alternatively or in addition to other suitable mechanism(s).

As mentioned above, decoder module 212 can be trained to identify linguistic aircraft control components. In such examples, training data including aircraft control communications (e.g., ATC clearances) can be used to train decoder module 212. The aircraft control communications can be actual aircraft control communications exchanged during aircraft operation, or can be synthesized (e.g., by pilots). As one example, aircraft control communications can be crowd-sourced from pilots via an online tool in which pilots enter (e.g., type or speak) aircraft control communications. In some examples, training data can be labeled to identify the linguistic aircraft control components included therein. Labels can be provided by hand or programmatically determined by decoder module 212 in a first pass and subsequently corrected in a second pass, as examples. Further, in some examples the training of decoder module 212 can include receiving feedback indicating an accuracy of the output of decoder module 212. For example, pilots can review the output of decoder module 212, providing any suitable feedback including but not limited to a rating of output, a yes/no indication of whether output is correct or incorrect, and corrections of incorrectly identified linguistic components. Thus, decoder module 212 can be trained according to an at least partially supervised learning process. In some examples, active learning can be employed to bootstrap additional training data to an initial training data set.

As described above, decoder module 212 can employ transducer 213 to identify linguistic aircraft control components. Alternatively or additionally, decoder module 212 can employ one or more neural networks (e.g., a deep neural network) to identify linguistic aircraft control components. In such examples, decoder module 212 can be trained via deep learning methods.

Decoder module 212 further validates one or more identified linguistic aircraft control components by accessing an aircraft-related knowledge base 214. Knowledge base 214 generally includes information with which an existence and/or other properties of linguistic aircraft control components can be validated. As examples, knowledge base 214 can include information regarding aircraft-related operations, which in some examples can relate to individual phases of flight (e.g., taxiing operations), callsigns such as the callsign of the autonomous aircraft with which dialogue occurs, information relating to the autonomous aircraft (e.g., features, specifications, components), ontological information regarding flight or phases thereof, and/or airdrome objects (e.g., runways, taxiways, fuel pits, gates, parking areas). As such, knowledge base 214 can be referred to as an airport-related knowledge base. Alternative or additional examples of information that can be stored in knowledge base 214 include operations such as cross, taxi, continue taxiing, proceed, follow, head in a particular direction, descend, land, and maintain altitude; destination indicators such as "to"; location indicators such as "via" and "on"; directions such as straight, left, and right; airline names; and/or airport names.

In some examples, a trie can be constructed based on knowledge base 214, where each leaf node of the trie is assigned a category label. An utterance/clearance/text can then be labeled with categories using the trie to thereby produce labeled linguistic aircraft control components (e.g., that form a decoded text string). Categories can include but are not limited to a callsign, number (e.g., altitude), destination or destination type, audience, operation, route indicator, and token. Labeled linguistic aircraft control components, or tokens, can be used to fill (e.g., via transducer 213) a template such as template 302.

As one example illustrating the validation of a linguistic aircraft control component, a callsign extracted from an ATC clearance can be validated by accessing knowledge base 214 and determining whether the callsign exists in the knowledge base 214. In some examples, knowledge base 214 can store variations of a callsign (and potentially other linguistic aircraft control components). Such callsign validation can be used to determine whether a clearance received at autonomous aircraft is directed to that autonomous aircraft or instead is directed to another entity and thus can be ignored. As another example of validation, a destination identified in an ATC clearance can be validated by determining whether the destination exists in knowledge base 214. Further, decoder module 212 can apply transducer 213 to knowledge base 214 to identify information therein, including but not limited to taxiing operations and operations for other phases of flight, destinations, and routes.

In some examples, decoder module 212 can use a mapping service 216 to validate a linguistic aircraft control component. For example, mapping service 216 can be accessed to validate a linguistic aircraft control component in the form of location information, such as an origin, destination, flight path, flight plan, coordinates (e.g., of an airport object), and/or any other suitable information. Mapping service 216 can provide any suitable functionality to service linguistic component validation, including but not limited to satellite or aerial imaging, topological mapping, traffic analysis, and/or route planning. Decoder module 212 thus can perform validation potentially in cooperation with other modules.

Decoder module 212 produces decoded information as output, which can include but is not limited to validated linguistic aircraft control components and validated, decoded clearances. The decoded information output from decoder module 212 is received by a state tracking module 218. State tracking module 218 stores an event log that includes communications (e.g., ATC clearances) between ATC and an autonomous aircraft. The event log can be implemented as a time-stamped dynamic queue or in any other suitable manner. Further, the event log can include any other suitable data, including but not limited to decoded ATC clearances and other instructions/commands, information regarding the state of the autonomous aircraft and/or components therein, and information regarding the surrounding world (e.g., ground and/or air traffic, weather information, communications with other aircraft). As described below, a command for controlling the autonomous aircraft can be determined in response to a received ATC clearance. Such command can be determined based on data stored in state tracking module 218. In some scenarios, this can include accessing data in the event log corresponding to prior events that occurred before the current time. For example, in determining a command for controlling the autonomous aircraft, the event log can be examined to identify and analyze ATC communications with other aircraft—e.g., to determine whether other aircraft are on the same runway as the autonomous aircraft, to identify a runway closure, or for any other suitable purpose. Such aspects enable state tracking module 218 to provide an autonomous aircraft with situational awareness.

Dialogue system 200 further includes a policy module 220 that performs decision making based on the output of one or other modules in system 200. For example, policy module 220 can determine commands to be sent to an executive module 222, which implements autopilot functionality to autonomously control an autonomous aircraft based on actions determined in dialogue system 200. In some examples, the determination of commands for controlling the autonomous aircraft can be determined cooperatively between decoder module 212 and policy module 220, and potentially other modules depicted in FIG. 2. Where command determination occurs at least in part at policy module 220, the policy module 220 can determine commands for controlling the autonomous aircraft based on one or more of validated, decoded output (e.g., decoded clearances) from decoder module 212 and events stored by state tracking module 218. As another example of potential cooperation between decoder module 212 and policy module 220, the policy module 220 can request the decoder module 212 to correct errors that occur in the course of decoding, such as an inability to decode/understand/identify a destination or other location.

Policy module 220 can determine messages to be sent to ATC (e.g., in response to previously received clearances). In some examples, policy module 220 can determine different messages depending on whether a clearance is validated and on whether the clearance is directed to the relevant autonomous aircraft. For example, policy module 220 can generate a first message in response to validating a clearance, where the first message includes a confirmation read back. Referring to the example depicted in FIG. 1, policy module 220 can generate the confirmation read back communicated in message 108 confirming clearance 106 issued from ATC tower 104. Further, policy module 220 can generate a second message in response to a failure to validate a clearance, where the second message includes an error message communicating the failed validation. The error message can request that ATC repeat the clearance and/or request further instruction, for example. If instead policy module 220 determines that a clearance is not directed to the relevant autonomous aircraft, the policy module 220 can forego generating a message.

Messages determined by policy module 220 can be relayed to ATC in speech synthesized via a natural language message module 224. Specifically, natural language message module 224 can generate a natural language response based on a message received from policy module 220. For example, natural language message module 224 can generate a first natural language response for output to an ATC operator in response to validating an identified linguistic aircraft control component, where the response indicates validation. Natural language message module 224 can further generate a second natural language response for output to an ATC operator in response to failing to validate an identified linguistic aircraft control component, where the response indicates such failure to validate. FIG. 2 illustrates the output of a natural language message 225 from natural language message module 224 to ATC tower 104. Natural language message module 224 can implement any suitable method of generating natural language messages, including but not limited to the use of a predefined ruleset.

As mentioned above, decoder module 212, potentially in cooperation with other modules such as policy module 220, can determine a command for controlling an autonomous aircraft based at least on one or more identified linguistic aircraft control components. In some examples, decoder module 212 can determine a command for controlling the autonomous aircraft by translating one or more validated clearances into the command. The determination of the command can include labeling linguistic aircraft control components and/or filling a template as described above. As one example, a template can be filled with labeled linguistic aircraft control components, where the template can include a command in the form of a taxi operation. Decoder module 212 can then determine a command based on the taxi operation—e.g., one or more actions that when executed actuate components of an autonomous aircraft to thereby perform the taxi operation.

A command determined via decoder module 212 can be issued to an aircraft management module 226, which can package the command in a format that is accepted by executive module 222. Executive module 222 then can execute the formatted command and thereby control the autonomous aircraft according to the command. As noted above, executive module 222 can implement autopilot functionality to autonomously control the autonomous aircraft based on received commands, where such autonomous control can involve any suitable actions to execute commands, including but not limited to controlling operation of a propulsion system and actuating aircraft components to achieve a flight path.

In some examples, executive module 222 can plan a flight path and validate the flight path (e.g., via one or both of knowledge base 214 and mapping service 216). If the flight path is validated, executive module 222 can send a message indicating validation of the flight path to dialogue system 200, which can be used for subsequent decision making, to relay a message to ATC, and/or for any other suitable purpose. In some examples in which a message indicating flight path validation is sent to ATC, a ground station operator can provide an input in response to the message that causes an autonomous aircraft to proceed along the flight path. Thus, in some examples, "autonomous aircraft" as used herein can refer to a fully autonomous aircraft, or in other examples, to a partially autonomous aircraft whose function is at least in part contingent upon input from a human operator. Generally, in some examples, a command for an autonomous aircraft can be reviewed or modified by air traffic control prior to execution by the autonomous aircraft.

In some examples, operation of dialogue system 200 can vary depending on the phase of flight for which communication with ATC is sought. Such adaptation can result from differences in the types of messages, terminology, operations, etc. between different phases of flight. In such examples, knowledge base 214 can store different data sets for different phases of flight—e.g., respective data sets for each of taxiing, takeoff, climb, cruise, descent, approach, and landing. Further, respective training data sets can be used to train decoder module 212 for each phase of flight. In some examples, different labels and/or templates can be used for different phases of flight.

The modules of dialogue system 200, and the other modules depicted in FIG. 2, can be implemented at any suitable location. As one example, decoder module 212, state tracking module 218, policy module 220, and executive module 222 can be implemented at an autonomous aircraft. Other modules, such as audio processing module 204 and/or speech recognition module 210, can be implemented at a ground station such as an ATC tower. Further, any suitable collection of modules can be implemented within dialogue system 200 or outside of the dialogue system. Still further, any suitable mechanisms can be used to implement one or more modules depicted in FIG. 2. In one example, modules 212, 218, 220, and 224 can each be implemented via one or more neural networks.

Figure 4:
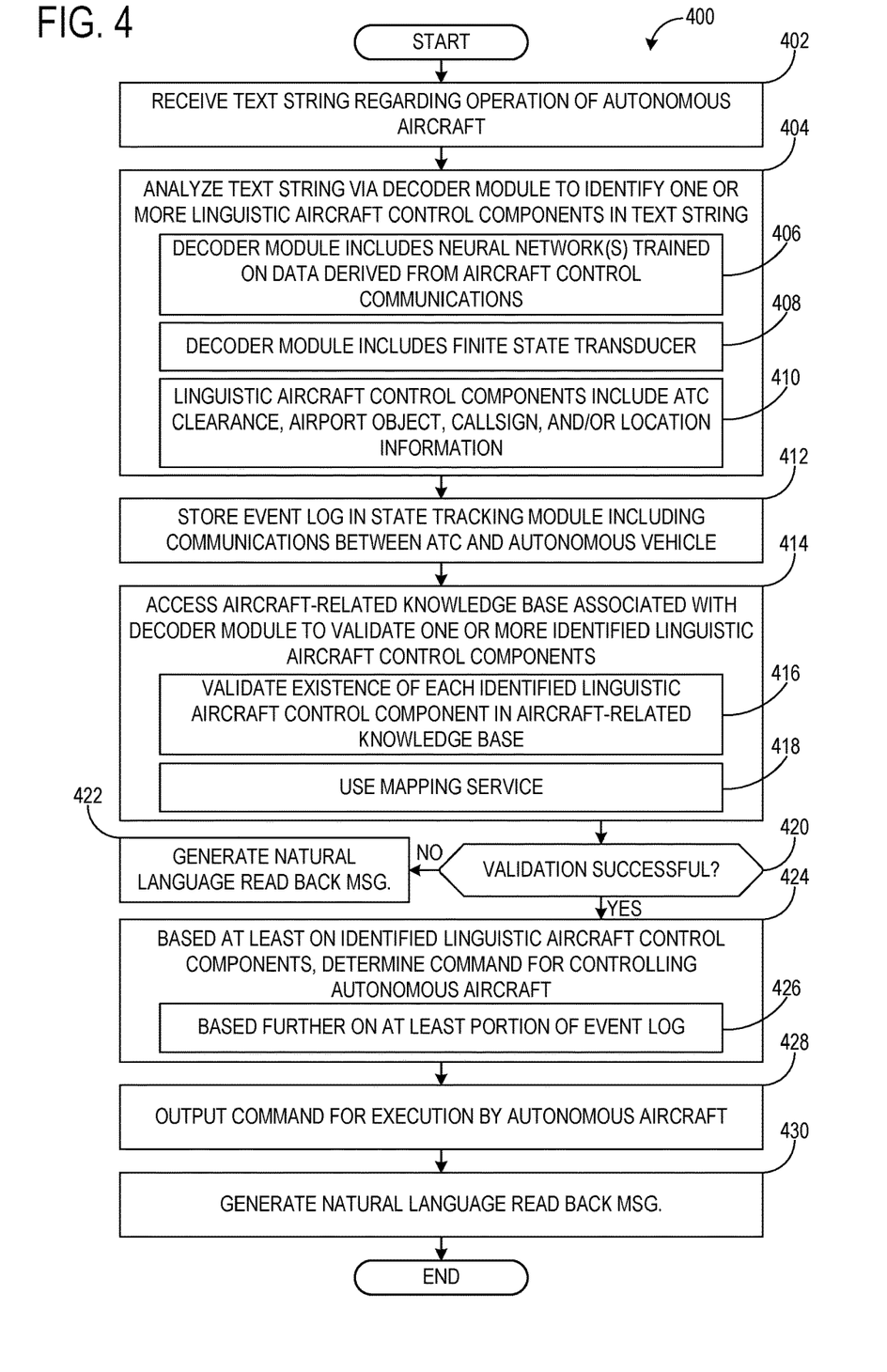
FIG. 4 shows an illustration of operations of a method performed according to an example embodiment of the present disclosure.

FIG. 4 shows a flowchart illustrating a method 400 of controlling autonomous aircraft. Method 400 can be implemented to control autonomous aircraft 102, for example.

At 402, method 400 includes receiving a text string regarding operation of the autonomous aircraft. The text string can be generated by performing speech recognition on audio capturing speech directed to operation of the autonomous aircraft, for example. At 404, method 400 includes analyzing the text string via a decoder module to identify one or more linguistic aircraft control components in the text string, the decoder module being trained on data derived from aircraft control communications. The aircraft control communications can include ATC communications, for example. The decoder module can include 406 one or more neural networks trained on the data derived from aircraft control communications. Alternatively or additionally, the decoder module can include 408 a transducer (e.g., trie- and/or finite-state transducer). The linguistic aircraft control components can include 410 one or more of an air traffic control clearance, an airport object, a callsign, and location information, as examples.

At 412, method 400 includes storing an event log in a state tracking module, the event log including communications between ATC and the autonomous vehicle. At 414, method 400 includes accessing an aircraft-related knowledge base associated with the decoder module to validate one or more identified linguistic aircraft control components. Accessing the aircraft-related knowledge base can include validating 416 an existence of each identified linguistic aircraft control component in the aircraft-related knowledge base. Alternatively or additionally, accessing the aircraft-related knowledge base can include using 418 a mapping service.

At 420, method 400 includes determining whether the validation at 414 succeeded. If the validation failed (NO), method 400 proceeds to 422 where a natural language read back message (e.g., natural language response) is generated in response to failing to validate the identified linguistic aircraft control component(s). The natural language read back message can indicate such failure to validate. If the validation succeeded (YES), method 400 proceeds to 424.

At 424, method 400 includes, based at least on the identified linguistic aircraft control components, determining a command for controlling the autonomous aircraft. The command can be determined based further on at least a portion 426 of the event log. Further, determining the command can include translating one or more (decoded, validated) clearances into the command.

At 428, method 400 includes outputting the command for execution by the autonomous aircraft. At 430, method 400 includes generating a natural language read back message (e.g., natural language response) in response to validating an identified linguistic aircraft control component. The natural language read back message can indicate that validation succeeded.

The approaches described herein provide a dialogue system with which communication between ATC and autonomous aircraft can be carried out via natural speech. In some examples, the dialogue system can facilitate dialogue throughout all phases of flight to support aircraft autonomy. Moreover, the dialogue system, potentially in concert with other systems, can account for situational and contextual information to support intelligent aircraft autonomy and awareness. These and other aspects of the disclosed approaches can expand the range of potential applications and uses of autonomous aircraft—e.g., including their use in controlled airspace—while reducing or eliminating human oversight over autonomous aircraft.

In some embodiments, the methods and processes described herein can be tied to a computing system of one or more computing devices. In particular, such methods and processes can be implemented as a computer-application program or service, an application-programming interface (API), a library, and/or other computer-program product.

Figure 5:
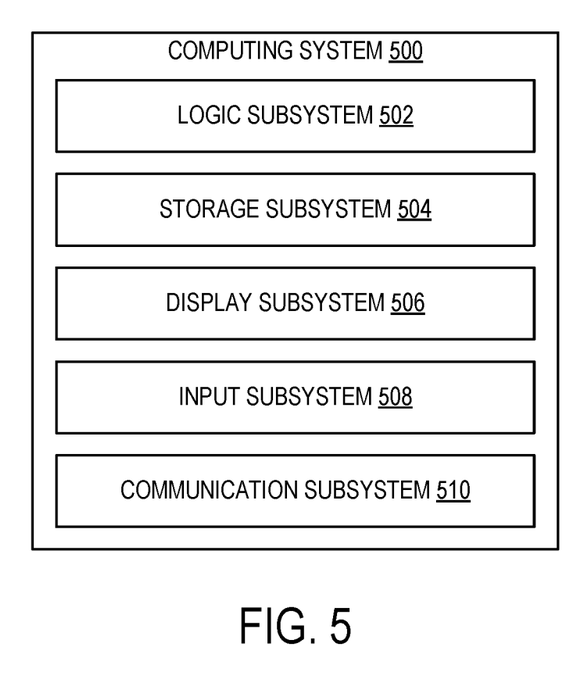
FIG. 5 shows a block diagram of a computing system according to an example embodiment of the present disclosure.

FIG. 5 schematically shows a non-limiting embodiment of a computing system 500 that can enact one or more of the methods and processes described above. Computing system 500 is shown in simplified form. Computing system 500 can take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic subsystem 502 and a storage subsystem 504. Computing system 500 can optionally include a display subsystem 506, input subsystem 508, communication subsystem 510, and/or other components not shown in FIG. 5.

Logic subsystem 502 includes one or more physical devices configured to execute instructions. For example, the logic machine can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic machine can include one or more processors configured to execute software instructions. Additionally or alternatively, the logic machine can include one or more hardware or firmware logic machines configured to execute hardware or firmware instructions. Processors of the logic machine can be single-core or multi-core, and the instructions executed thereon can be configured for sequential, parallel, and/or distributed processing. Individual components of the logic machine optionally can be distributed among two or more separate devices, which can be remotely located and/or configured for coordinated processing. Aspects of the logic machine can be virtualized and executed by remotely accessible, networked computing devices configured in a cloud-computing configuration.

Storage subsystem 504 includes one or more physical devices configured to hold instructions executable by the logic machine to implement the methods and processes described herein. When such methods and processes are implemented, the state of storage subsystem 504 can be transformed—e.g., to hold different data.

Storage subsystem 504 can include removable and/or built-in devices. Storage subsystem 504 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 can include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, aspects of the instructions described herein alternatively can be propagated by a communication medium (e.g., an electromagnetic signal, an optical signal, etc.) that is not held by a physical device for a finite duration.

Aspects of logic subsystem 502 and storage subsystem 504 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 500 implemented to perform a particular function. In some cases, a module, program, or engine can be instantiated via logic subsystem 502 executing instructions held by storage subsystem 504. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In some implementations, a service can run on one or more server-computing devices.

When included, display subsystem 506 can be used to present a visual representation of data held by storage subsystem 504. This visual representation can take the form of a graphical user interface (GUI). As the herein described methods and processes change the data held by the storage machine, and thus transform the state of the storage machine, the state of display subsystem 506 can likewise be transformed to visually represent changes in the underlying data. Display subsystem 506 can include one or more display devices utilizing virtually any type of technology. Such display devices can be combined with logic subsystem 502 and/or storage subsystem 504 in a shared enclosure, or such display devices can be peripheral display devices.

When included, input subsystem 508 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 can be configured to communicatively couple computing system 500 with one or more other computing devices. Communication subsystem 510 can include wired and/or wireless communication devices compatible with one or more different communication protocols. As non-limiting examples, the communication subsystem can be configured for communication via a wireless telephone network, or a wired or wireless local- or wide-area network. In some embodiments, the communication subsystem can allow computing system 500 to send and/or receive messages to and/or from other devices via a network such as the Internet.

Another example provides a method of controlling autonomous aircraft, the method comprising receiving a text string regarding operation of an autonomous aircraft, analyzing the text string via a decoder module to identify one or more linguistic aircraft control components in the text string, the decoder module being trained on data derived from aircraft control communications, accessing an aircraft-related knowledge base associated with the decoder module to validate one or more identified linguistic aircraft control components, based at least on the identified linguistic aircraft control components, determining a command for controlling the autonomous aircraft, and outputting the command for execution by the autonomous aircraft. In such an example, the aircraft control communications can include air traffic control communications. In such an example, the text string can be generated by performing speech recognition on audio capturing speech directed to operation of the autonomous aircraft. In such an example, the decoder module can include one or more neural networks trained on the data derived from aircraft control communications. In such an example, the decoder module alternatively or additionally can include a finite state transducer. In such an example, validating the one or more identified linguistic aircraft control components can include validating an existence of each identified linguistic aircraft control component in the aircraft-related knowledge base. In such an example, validating the one or more identified linguistic aircraft control components alternatively or additionally can include using a mapping service. In such an example, the one or more identified linguistic aircraft control components can include one or more of an air traffic control clearance, an airport object, a callsign, and location information. In such an example, the method alternatively or additionally can include generating a first natural language response for output to an air traffic control operator in response to validating an identified linguistic aircraft control component, and generating a second natural language response for output to an air traffic control operator in response to failing to validate the identified linguistic aircraft control component. In such an example, the command can be modified by air traffic control prior to execution by the autonomous aircraft. In such an example, the method alternatively or additionally can include storing an event log in a state tracking module, the event log including communications between air traffic control and the autonomous vehicle. In such an example, the command alternatively or additionally can be determined based further on at least a portion of the event log. In such an example, the decoder module alternatively or additionally can be separately trained for each of a plurality of phases of flight.

Another example provides a system for controlling autonomous aircraft, the system comprising a logic subsystem, and a storage subsystem comprising instructions executable by the logic subsystem to receive a text string regarding operation of an autonomous aircraft, analyze the text string via a decoder module to identify one or more linguistic aircraft control components in the text string, the decoder module being trained on data derived from aircraft control communications, access an aircraft-related knowledge base associated with the decoder module to validate one or more identified linguistic aircraft control components, based at least on the identified linguistic aircraft control components, determine a command for controlling the autonomous aircraft, and output the command for execution by the autonomous aircraft. In such an example, the decoder module can include one or more neural networks trained on the data derived from aircraft control communications. In such an example, the instructions executable to validate the one or more identified linguistic aircraft control components can be executable to validate an existence of each identified linguistic aircraft control component in the aircraft-related knowledge base. In such an example, the one or more identified linguistic aircraft control components can include one or more of an air traffic control clearance, an airport object, a callsign, and location information. In such an example, the storage subsystem alternatively or additionally can include instructions executable by the logic subsystem to store an event log in a state tracking module, the event log including communications between air traffic control and the autonomous vehicle. In such an example, the command alternatively or additionally can be determined based further on at least a portion of the event log.

Another example provides an autonomous aircraft comprising a propulsion system, a logic subsystem, and a storage subsystem comprising instructions executable by the logic subsystem to receive a text string regarding operation of the autonomous aircraft, analyze the text string via a decoder module to identify one or more linguistic aircraft control components in the text string, the decoder module being trained on data derived from aircraft traffic control communications, access an aircraft-related knowledge base associated with the decoder module to validate one or more identified linguistic aircraft control components, based at least on the identified linguistic aircraft control components, determine a command for controlling the autonomous aircraft, and transmit an indication of the command to air traffic control.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method of controlling an autonomous aircraft, the method comprising:
   receiving a text string regarding operation of the autonomous aircraft;
   analyzing the text string via a decoder module to identify one or more linguistic aircraft control components in the text string, wherein the one or more identified linguistic aircraft control components include a flight plan of the autonomous aircraft;
   accessing an aircraft-related knowledge base associated with the decoder module to confirm an accuracy of each of the one or more identified linguistic aircraft control components, and wherein confirming an accuracy of the flight plan includes using a mapping service to confirm an origin and a destination of the autonomous aircraft;

based at least on the identified linguistic aircraft control components, determining a command for controlling the autonomous aircraft; and executing the command to control the autonomous aircraft.

2. The method of claim 1, where the decoder module is trained on data derived from air traffic control communications.

3. The method of claim 1, where the text string is generated by performing speech recognition on audio capturing speech directed to operation of the autonomous aircraft.

4. The method of claim 1, where the decoder module includes one or more neural networks trained on data derived from aircraft control communications.

5. The method of claim 1, where the decoder module includes a finite state transducer.

6. The method of claim 1, where confirming the accuracy of the one or more identified linguistic aircraft control components includes validating an existence of each identified linguistic aircraft control component in the aircraft-related knowledge base.

7. The method of claim 1, where the one or more identified linguistic aircraft control components include one or more of an air traffic control clearance, an airport object, a callsign, and location information.

8. The method of claim 1, further comprising generating a first natural language response for output to an air traffic control operator in response to confirming an accuracy of an identified linguistic aircraft control component, and generating a second natural language response for output to an air traffic control operator in response to failing to confirm an accuracy of the identified linguistic aircraft control component.

9. The method of claim 1, where the command is modified by air traffic control prior to execution by the autonomous aircraft.

10. The method of claim 1, further comprising storing an event log in a state tracking module, the event log including communications between air traffic control and the autonomous vehicle.

11. The method of claim 10, where the command is determined based further on at least a portion of the event log.

12. The method of claim 1, where the decoder module is separately trained for each of a plurality of phases of flight.

13. The method of claim 1, wherein the mapping service includes one or more of satellite imaging, aerial imaging, topological mapping, traffic analysis, and route planning.

14. A system for controlling an autonomous aircraft, the system comprising:
a logic subsystem; and
a storage subsystem comprising instructions executable by the logic subsystem to:
receive a text string regarding operation of the autonomous aircraft;
analyze the text string via a decoder module to identify one or more linguistic aircraft control components in the text string, wherein the one or more identified linguistic aircraft control components include a flight plan of the autonomous aircraft;
access an aircraft-related knowledge base associated with the decoder module to confirm an accuracy of each of the one or more identified linguistic aircraft control components, and wherein confirming an accuracy of the flight plan includes using a mapping service to confirm an origin and a destination of the autonomous aircraft;
based at least on the identified linguistic aircraft control components, determine a command for controlling the autonomous aircraft; and
execute the command to control the autonomous aircraft.

15. The system of claim 14, where the decoder module includes one or more neural networks trained on data derived from aircraft control communications.

16. The system of claim 14, where the instructions executable to confirm the accuracy of the one or more identified linguistic aircraft control components are executable to validate an existence of each identified linguistic aircraft control component in the aircraft-related knowledge base.

17. The system of claim 14, where the one or more identified linguistic aircraft control components include one or more of an air traffic control clearance, an airport object, a callsign, and location information.

18. The system of claim 14, further comprising instructions executable to store an event log in a state tracking module, the event log including communications between air traffic control and the autonomous vehicle.

19. The system of claim 18, where the command is determined based further on at least a portion of the event log.

20. An autonomous aircraft, comprising:
a logic subsystem; and
a storage subsystem comprising instructions executable by the logic subsystem to:
receive a text string regarding operation of the autonomous aircraft;
analyze the text string via a decoder module to identify one or more linguistic aircraft control components in the text string, wherein the one or more identified linguistic aircraft control components include a flight plan of the autonomous aircraft;
access an aircraft-related knowledge base associated with the decoder module to confirm an accuracy of each of the one or more identified linguistic aircraft control components, and wherein confirming an accuracy of the flight plan includes using a mapping service to confirm an origin and a destination of the autonomous aircraft;
based at least on the identified linguistic aircraft control components, determine a command for controlling the autonomous aircraft;
execute the command to control the autonomous aircraft; and
transmit an indication of the command to air traffic control.

\* \* \* \* \*